United States Patent Office 3,772,329
Patented Nov. 13, 1973

3,772,329
7-SULFAMOYL INDOLE DERIVATIVES
Paul S. Huyffer, Lexington, Mass., assignor to
Polaroid Corporation, Cambridge, Mass.
No Drawing. Filed Jan. 21, 1971, Ser. No. 108,663
Int. Cl. C07d 27/56
U.S. Cl. 260—326.12 R    3 Claims

ABSTRACT OF THE DISCLOSURE

This invention relates to indoles substituted in the 7-position with a sulfonamido or sulfamoyl group which are useful as intermediates in the preparation of indole indicator dyes, such as, indole phthaleins.

BACKGROUND OF THE INVENTION (1) Field of the invention

This invention relates to novel indoles, and in particular it relates to indoles which contain either a sulfonamido or sulfamoyl substituent in the 7-position of the indole ring.

(2) Description of the prior art

Copending U.S. patent application Ser. No. 108,277 of Stanley M. Bloom, Alan L. Borror and Paul S. Huyffer field Jan. 21, 1971, discloses and claims certain indicator dyes derived from indoles, which find particular utility as optical filter agents in photographic processes for protecting an exposed photosensitive material from post-exposure fogging during development in the presence of extraneous incident light. Specifically, the indole indicator dyes disclosed therein comprise phthaleins containing two indol-3-yl radicals at least one of which possesses a hydrogen-bonding group substituted on a carbon atom adjacent to the nitrogen of the indole ring. Among such dyes are phthalides and naphthalides containing a hydrogen-bonding group in the 7-position, such as 7-carboxyindole, 7-sulfonamidoindole and 7-sulfamoylindole. Indoles substituted in the 7-position with a sulfonamido or a sulfamoyl moiety useful as intermediates in the preparation of these indicator dyes comprise the subject matter of the present invention.

SUMMARY OF THE INVENTION

It is the primary object of the present invention to provide novel indoles.

It is another object of the present invention to provide novel indoles useful as intermediates in the preparation of indole indicator dyes.

Other objects of this invention will in part be obvious and will in part appear hereinafter.

The invention accordingly comprises the products and compositions possessing the features, properties and the relation of elements which are exemplified in the following detailed disclosure, and the scope of the application of which will be indicated in the claims.

According to the present invention indoles are provided which possess a sulfonamido or sulfamoyl substituent in the 7-position which compounds will be defined with greater particularity hereinafter.

For a fuller understanding of the nature and objects of the invention, reference should be had to the following detailed descrip.,n

DESCRIPTION OF THE PREFERRED EMBODIMENTS

Specifically, the compounds comprehended by the present invention may be represented by the formula:

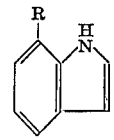

wherein R is selected from —NH—SO$_2$—R$^1$ and

—SO$_2$—NH—R$^2$ wherein R$^1$ and R$^2$ each is a group selected from alkyl, aryl, alkaryl, and aralkyl.

The groups R$^1$ and R$^2$ usually contain up to about 20 carbon atoms but may contain a greater number of carbon atoms as may be desired. When selected from alkyl, alkaryl and aralkyl, the alkyl group or the alkyl portion of the alkaryl and aralkyl groups may be branched or straight chain. Examples of groups that may comprise R$^1$ and R$^2$ include alkyl, such as methyl, ethyl, propyl, isopropyl, sec-butyl, tert-butyl, hexyl, octyl, decyl, dodecyl, hexadecyl, octadecyl and eicosanyl; aryl, such as phenyl and naphthyl; alkaryl, such as, benzyl, phenethyl, phenylhexyl; and aralkyl, such as, p-hexylphenyl, p-octylphenyl, and p-dodecylphenyl.

Besides the sulfonamido or sulfamoyl group R in the 7-position, the indoles of the present invention may contain other substituents which do not interfere with the function of the compound for its selected ultimate use. Typical substituents include branched or straight chain alkyl, such as methyl, ethyl, isopropyl, n-butyl, t-butyl, hexyl, octyl, dodecyl, hexadecyl, octadecyl and eicosanyl; aryl, such as, phenyl, 2-hydroxyphenyl, 2-hydroxy-4-dodecyloxyphenyl, and naphthyl; alkaryl, such as, benzyl, phenethyl, phenylhexyl, p-octylphenyl, p-dodecylphenyl; alkoxy, such as, methoxy, ethoxy, butoxy, 1-ethoxy-2-(β-ethoxyethoxy), dodecyloxy and octadecyloxy; aryloxy, such as phenoxy, benzyloxy, naphthoxy; alkoxyalkyl, such as methoxyethyl, dodecyloxyethyl; halo such as, fluoro, bromo, and chloro; trifluoroalkyl, such as trifluoromethyl; sulfonyl; sulfo; cyano, carboxy; hydroxy; acyl, such as acetyl; propionyl; amido, such as, acetamido, butyramido; amino including mono- and disubstituted amino, e.g., N-ethylamino and N,N'-dimethylamino. Where the indole is to be used in the synthesis of indicator dyes for example, indol-3-yl phthalides and naphthalides, the substituents will be in the 2-,4-,5- or 6-position leaving the 3-position free for further reaction to form the indicator dye.

Specific examples of indoles within the scope of the present invention are as follows:

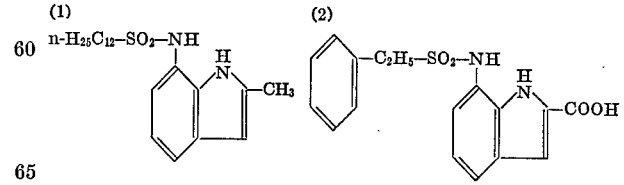

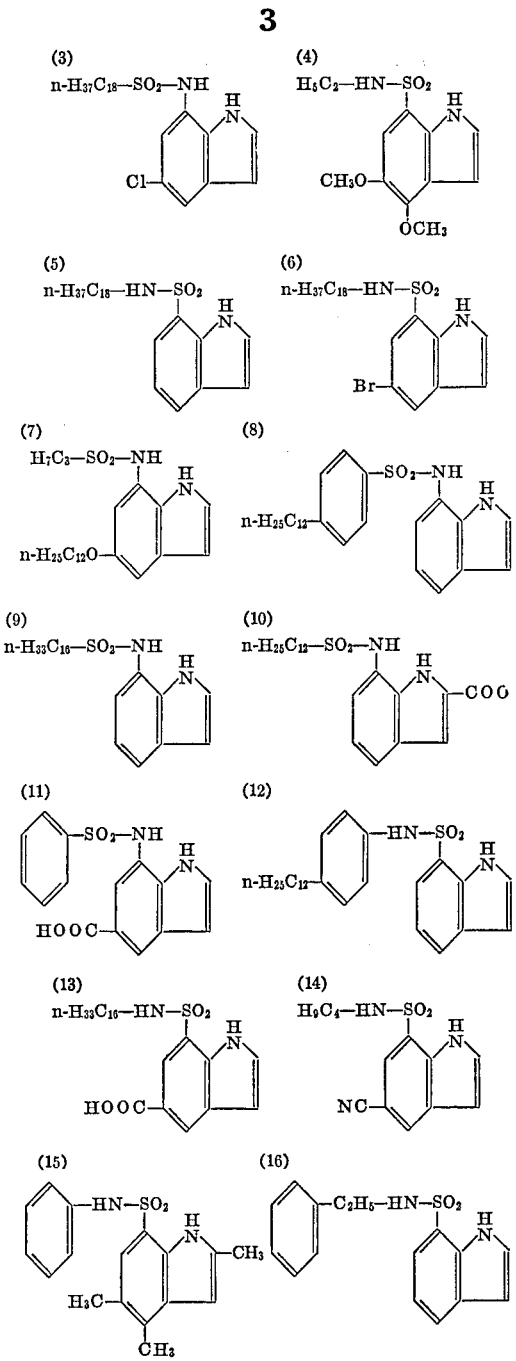

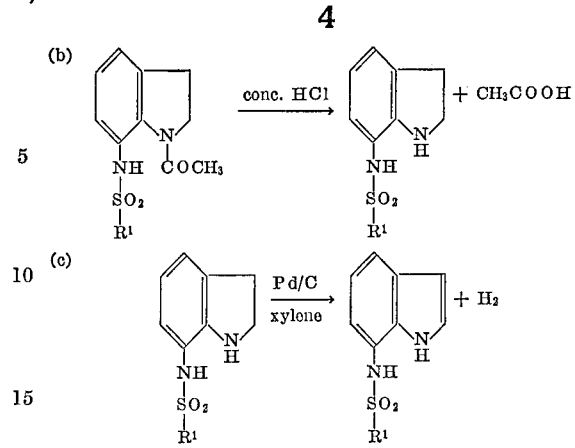

In the preparation of the 7-sulfamoyl indoles of the present invention, a 5-halo-N-acetylindoline, such as, 5-bromo-N-acetylindoline is reacted with chlorosulfonic acid to yield the corresponding 7-chlorosulfonyl acetylindoline which is then reacted with a primary alkyl, alkaryl, aralkyl or aryl amine to form the corresponding 7-sulfamoyl acetylindoline. Deacetylation followed by oxidation of the indoline yields the 5-bromo-7-sulfamoyl indole which may be debrominated to give the 7-sulfamoyl indole. The above sequence of steps is illustrated below:

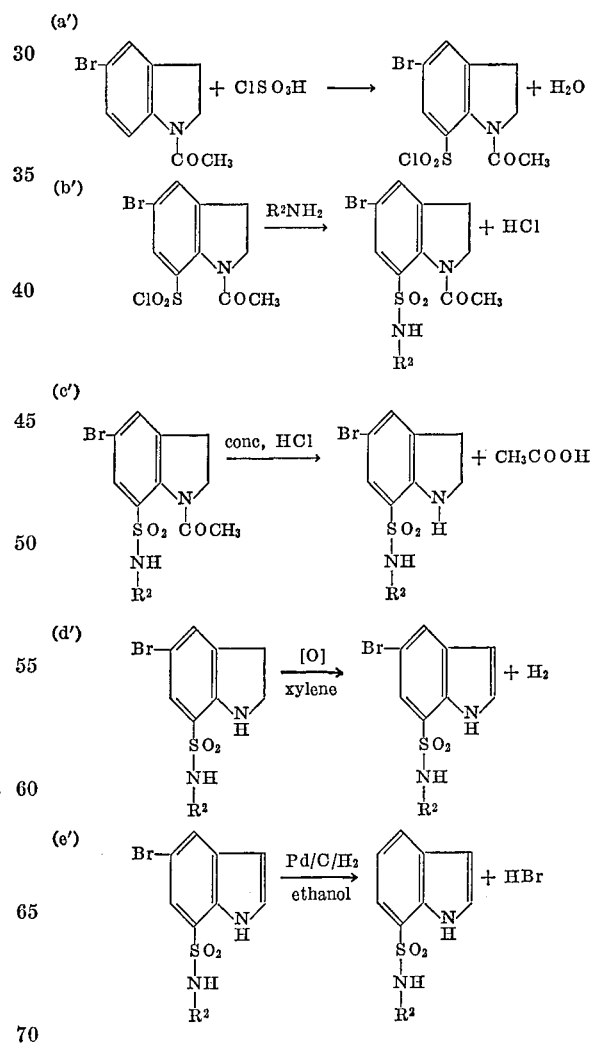

To prepare the 7-sulfonamido indoles of the present invention, 7-amino-N-acetylindoline is reacted with the selected alkyl, aryl, alkaryl or aralkyl sulfonyl chloride to yield a 7-sulfonamido-N-acetylindoline which is then deactylated. Catalytic dehydrogenation of the deacetylated 7-sulfonamido indoline gives the corresponding 7-sulfonamido indole product. The sequence of steps employed are illustrated below.

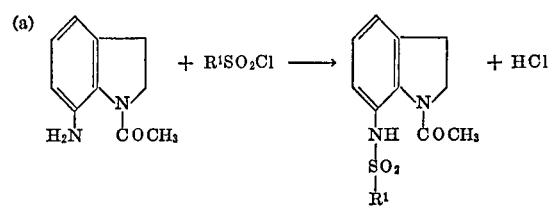

Rather than performing the oxidation and debromination reactions separately, steps (d') and (e') may be combined by employing palladium-on-carbon to convert the indoline to the corresponding indole and using the hydrogen produced in the conversion for debromination.

In the above reaction schemes, steps (a) to (c) and steps (a') to (e') may be carried out in a conventional manner. For example, any strong acid as commonly used for acid hydrolysis may be employed in the de-acetylations and any suitable dehydrogenation catalysts and oxidants may be employed for converting the indoline to the corresponding indole. Debromination may be carried out as above or using metallic zinc in alcoholic solution or in any other suitable and convenient manner.

The starting indolines for the above syntheses are known in the art and may be prepared, for example, according to the procedure reported by Gall, et al., J. Org. Chem. 20, 1538 (1955). Using their procedure, N-acetylindoline is brominated to give 5-bromo-N-acetylindoline, the starting material for the 7-sulfamoylindoles. The brominated indoline is then nitrated to give 5-bromo-7-nitro-N-acetylindoline. Catalytic hydrogenation of the latter compound over a palladium-on-carbon catalyst results in removal of the bromine as well as reduction of the nitro group to yield 7-amino-N-acetylindoline, the starting material for the 7-sulfonamido indoles. The starting indolines may contain additional substituents as may be desired in the indole product such as the substituents enumerated above. In preparing indoles to be used as intermediates in the synthesis of indol-3-yl phthaleins, it will be appreciated that the starting indolines will possess two hydrogens in the 3-position and at least one hydrogen in the 2-position.

The following examples are given to further illustrate the present invention and are not intended to limit the scope thereof.

EXAMPLE 1

Preparation of 7-hexadecylsulfonamidoindole (a) A mixture of 7-amino-N-acetylindoline (74.3 g., 0.421 mole), 1-hexadecane sulfonyl chloride (204.8 g., 0.631 mole) and disopropylethylamine (82 g., 0.631 mole) in 700 ml. dry chloroform was stirred and refluxed gently for 2 days on a steam bath. The solution was then evaporated to dryness, and the residue was recrystallized from 2000 ml. iso-propanol (Norite) to give 119 g. (61% by weight) yield of 7-hexadecylsulfonamido-N-acetylindoline as white crystals; melting range 94–96° C.

(b) A mixture of 7-hexadecylsulfonamido-N-acetylindoline (119 g., 0.256 mole), 165 ml. of concentrated hydrochloric acid and 475 ml. of dioxane was stirred and refluxed for 3 hours. The solution was then cooled in an ice bath and it was then neutralized to pH 7 with dilute sodium hydroxide solution. The precipitate was filtered, washed with water and dried, and recrystallized from 1200 ml. methanol (Norite) to give 70 g. (65% by weight yield) of 1-hexadecylsulfonamidoindoline as white crystals; melting range 66–68° C.

(c) A mixture of 7-hexadecylsulfonamidoindoline (9 g., 0.0211 mole) and 1 g. of 30% Pd/C in 100 ml. xylene was refluxed overnight. The catalyst was filtered off and the filtrate was evaporated to an oil, which solidified on cooling to give 9 g. of crude material. This was recrystallized from 100 ml. of 80% ethanol (Norite) to give 7 g. (78% by weight yield) of 7-hexadecylsulfonamidoindole as an off-white solid; melting range 82–24° C.

EXAMPLE 2

Preparation of 7-octadecylsulfamoylindole (a') To 100 gms. (0.416 mole) of 5-bromo-N-acetylindoline cooled in an ice bath was added all at once 141 ml. of chlorosulfonic acid. The mixture was stirred for a few minutes in the ice bath and then placed on a steam bath and the mixture (magenta color) was stirred overnight. The cooled solution was then poured over ice and the precipitate was filtered and washed with water. The dry solid was then recrystallized from chloroform (Norite) (concentration of chloroform gave additional material). Yield 49 gms. (35% by weight), melting range 211°–213° C. (dec).

(b') A mixture of 18 gms. (0.0531 mole) of 5-bromo-7-chlorosulfonyl-N-acetylindoline prepared in step (a'), and 14.3 gms. (0.0531 mole) of octadecylamine and 6.91 gms. (0.0531 mole) of N,N-diisopropylethyl amine in 300 ml. dry chloroform was stirred and gently refluxed on a steam bath for 2 hours. The solution was evaporated to dryness in vacuo, and the residue was recrystallized from 600 ml. of methanol. Yield 26.7 gms. (88% by weight); melting range 120°–122° C.

(c') A mixture of 26.7 gms. (0.0467 mole) of 5-bromo-7-octadecylsulfamoyl-N-acetylindoline prepared in step (b') and 30.5 ml. concentrated hydrochloric acid in 115 ml. dioxane was refluxed with stirring for 1½ hours. The solution was then cooled in an ice bath and then neutralized with dilute sodium hydroxide solution. The precipitate was filtered and washed with water and dried. The residue was recrystallized from 450 ml. methanol (Norite); yield 20.3 gms. (82% by weight).

(d') A mixture of 20 gms. (0.0378 mole) of 5-bromo-7-octadecylsulfamoylindoline prepared in step (c') and 2.45 gms. (0.0416 mole) of 2,3-dichloro-5,6-dicyano-1,4-benzoquinone in 200 ml. p-Xylene was stirred and refluxed for 30 minutes. The mixture (cold) was filtered, and the filtrate was evaporated to a dark oil. This oil was recrystallized from 400 ml. 80% ethanol (Norite); yield 17.8 gms. (18% by weight) melting range 82°–84° C.

(e') A mixture of 5 gms. (0.00947 mole) of 5-bromo-7-octadecylsulfamoylindole prepared in step (d') and 0.6 gm. 10% Pd/C in 150 ml. of absolute ethanol was hydrogenated (40 lbs./p.s.i.) in a Paar hydrogenator for 40 hours. The mixture was heated on a steam bath to dissolve the solid and filtered from the catalyst. The filtrate was concentrated to a small volume, the solid redissolved by heating on a steam bath and left to crystallize first at room temperature and then in an ice bath to give 2.8 gms. (66% by weight) of the title compound as a white solid; melting range 110°–112° C.

EXAMPLE 3

Preparation of 7-dodecylphenylsulfonamidoindole

The title compound was prepared in accordance with the procedure of Example 1 above except that 1-dodecylbenzene sulfonyl chloride was substituted for 1-hexadecane sulfonyl chloride.

As noted previously, the indoles of the present invention are useful as intermediates in the preparation of indicator dyes, such as, the phthaleins disclosed and claimed in copending U.S. patent application Ser. No. 108,277. Such dyes find utility in titrations and other analytical procedures where phthalein indicator dyes are commonly employed, for example, to measure changes in pH value. Because of their spectral absorption characteristics in combination with certain other properties they find particular utility as optical filter agents in photographic processes where development of a selectively exposed photosensitive material is performed at least in part outside the confines of a camera in the presence of extraneous incident actinic radiation.

A preferred method of preparing such indole phthaleins comprises reacting the indole with phthalaldehydic or naphthalaldehydic acid in the presence of a mild acid catalyst, e.g., toluene-p-sulfonic acid, to yield the corresponding phthalidyl- or naphthalidyl-indole intermediate which is oxidized by treating with, for example, dichloro dicyanoquinone. The oxidized intermediate is then reacted with another mole of indole, the same or different, in the presence of an acid catalyst to yield the desired dye. This method of preparing indole phthaleins and phthaleins derived from other selected aromatic compounds forms the subject matter of copending U.S. patent application Ser. No. 108,662 of Alan L. Borror filed Jan. 21, 1971.

Since certain changes may be made in the above product without departing from the scope of the invention herein involved, it is intended that all matter contained in

What is claimed is:
1. A compound of the formula:

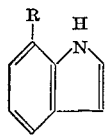

wherein R is the sole substituent and is —$SO_2$—NH—$R^2$ is a group containing up to 20 carbon atoms selected from alkyl, aryl selected from phenyl and naphthyl, unsubstituted alkaryl and unsubstituted aralkyl.

2. A compound as defined in claim 1 wherein $R^2$ is alkyl.

3. A compound as defined in claim 2 wherein said alkyl is octadecyl.

References Cited
UNITED STATES PATENTS

| | | | |
|---|---|---|---|
| 3,083,207 | 3/1963 | Hoehn et al. | 260—326.12 X |
| 3,264,321 | 8/1966 | Herbst | 260—326.12 |
| 3,297,717 | 1/1967 | Gould et al. | 260—326.12 |
| 3,472,870 | 10/1969 | Larsen et al. | 260—326.12 |

JOSEPH A. NARCAVAGE, Primary Examiner

U.S. Cl. X.R.

96—63